United States Patent
Rabadan et al.

(10) Patent No.: US 7,600,115 B2
(45) Date of Patent: Oct. 6, 2009

(54) CONTROL KEY CAPABLE OF STORING MULTIPLE AND VARIABLE DATA PACKET CLASSIFICATION RESULTS

(75) Inventors: Carlos Lopez Rabadan, San Jose, CA (US); Jordi Juan Guillem, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 11/099,811

(22) Filed: Apr. 5, 2005

(65) Prior Publication Data

US 2006/0224884 A1 Oct. 5, 2006

(51) Int. Cl.
*H04L 9/00* (2006.01)
*H04L 29/06* (2006.01)
(52) U.S. Cl. .......................... 713/160; 726/13
(58) Field of Classification Search ................ 713/153, 713/160; 380/239–240; 726/13
See application file for complete search history.

(56) References Cited

U.S. PATENT DOCUMENTS

| | | | | |
|---|---|---|---|---|
| 5,003,597 A | * | 3/1991 | Merkle | 380/37 |
| 5,414,650 A | * | 5/1995 | Hekhuis | 708/203 |
| 6,108,421 A | * | 8/2000 | Kurdziel et al. | 380/28 |
| 6,985,431 B1 | * | 1/2006 | Bass et al. | 1/1 |
| 7,233,948 B1 | * | 6/2007 | Shamoon et al. | 707/9 |

* cited by examiner

*Primary Examiner*—Gilberto Barron, Jr.
*Assistant Examiner*—Samson B Lemma
(74) *Attorney, Agent, or Firm*—Trellis IP Law Group, PC

(57) ABSTRACT

Methods, systems, and an apparatus for generating and dispatching a flexible control key to be appended with the data packets while being dispatched across a plurality of software modules running on the integrated network security device, are provided. The control key is divided into two sections: an operations (ingress/egress) section, and an application section. The ingress section includes the invariable-ordered set of operations to be performed to the data packet at the device's input. The egress section includes the invariable-ordered set of operations to be performed to the data packet at the receiver's address. The application section includes the sequence of applications to be performed to the data packet while being processed by the integrated network security device. The operation section is encoded using bit encoding technique. The application section is encoded by using a binary operation encoding technique, which allows variable sequences of execution.

20 Claims, 6 Drawing Sheets

CONTROL KEY CAPABLE OF STORING MULTIPLE AND VARIABLE DATA PACKET CLASSIFICATION RESULTS

BACKGROUND OF THE INVENTION

1. Field of Invention

Embodiments of the invention relate in general to the field of data communication. More specifically, the embodiments relate to methods and systems for generating a control key that is to be appended with a data packet being transmitted through different software/hardware modules of an integrated network security device.

2. Description of the Background Art

In the world of data packet switched network appliances, different security technologies (VPN, Firewall, IDS) are merging on a single platform. This results in data packets undergoing many operations while being transmitted through the integrated network security device. Network appliances save dynamic information in the form of per-connection objects. Connections are first filtered through a classification engine, which determines what applications (also called plug-in modules, functionalities or operations) are to be applied to [1] data packets belonging to that connection. The decision, regarding the applications to be applied, is then stored in the connection object as a control key.

The control key is retrieved from the connection object and parsed, in order to apply the required operations to the data packets of a connection. A dispatcher unit processes the control key and sends the data packets to the required applications, in the order specified by the control key. The control key stores the processing state of the given packet, i.e. it stores which operations have already been performed and which operations need to be performed.

Since the total storage required for the connection objects is proportional to the key size, minimizing the size of the control key would reduce the total amount of memory required to store the connections database. Since millions of connection objects are stored in the device memory, minimizing the size of the control key would increase the number of connection objects that can be stored in a given memory.

Various techniques are adopted in the art, to minimize the size of the control key. One technique is to provide flexibility to the order of the applications sequence, which results in an increase in the size of the control key. However, the control key has to be engineered in such a way that while its size is minimized, its functioning is not affected.

A conventional technique, available in the art, to maximize the flexibility of the control key is the horizontal microcode. The horizontal microcode is formed of bit groups that are directly translated to the operations being referred to by these bit groups. This technique allows all the possible combinations of operations and their ordering, at the expense of larger instruction sets. However, usage of this technique has usually been restricted to the lowest level of software technology and has not been used in high-speed embedded systems, such as integrated security devices for data packet processing. [1]

Another conventional technique, available in the art, to minimize the size of the control key is vertical microcodes. The vertical microcode consists in encoding the software modules being applied to a given data packet, in an invariable order, using bits. This technique allows all possible operations to be encoded, but only in a unique invariable and specific (hard coded) ordering schema.

A third conventional technique consists in encoding each combination of operations with a unique identifier. For example, if {a,b} corresponds to all possible operations, all possible combinations are coded as {a}=1, {b}=2, {a,b}=3, {b,a}=4, {a,a}=5, {b,b}=6. This technique provides the maximum level of ordering flexibility using a minimum control key size, at the expense of a more complex control key decoding mechanism requiring a higher CPU usage. However, this technique would require a complex state machine to store the current state of the processing. i.e. transforming the key such that only the remaining operations to a given packet are stored in the new control key. This functionality is, although theoretically possible, complex and non-scalable.

DETAILED DESCRIPTION OF THE EMBODIMENTS OF THE INVENTION

The invention provides a method, a system, and a computer program product for generating a control key that is to be appended with a data packet. The data packet is transmitted through an integrated network security device, such as firewall, encryption/decryption and intrusion detection systems, along with the appended control key. The integrated network security device transmits the data packet across a plurality of applications running on it. The control key stores the sequence of applications to be performed with the data packet while being transmitted. The invention is applicable for data packet switched network appliances, wherein various security applications, such as Virtual Private Network (VPN), firewall, and the Intrusion Detection System (IDS), can be integrated on a single platform.

In various embodiments of the invention, the control key is divided into two sections, based on the kind of applications stored in them. The two sections in the control key are an operations section, and an application section. The operations section is used for encoding basic security software modules applied in an invariable order, here called 'operations'. The encoding in the operations section is performed using bits. The application section is used for encoding, in binary, the programmable sequence of advanced security software modules to be applied in a variable order to a given packet, here called 'applications'. [1]

Basic security software modules ('operations') are basic checks that need to be (or not need to be) applied in a static order for any given packet. Examples of these operations are protocol conformance checks (Ethernet, IP, TCP/UDP). Advanced security software modules ('applications') are to be understood as advanced checks that may be needed, in a dynamic order as calculated by a filtering and policing processor, for a given connection. Examples of these applications are string filtering, regular expression match, intrusion detection and prevention, encryption, decryption and advanced firewall features.

In accordance with an embodiment, the invention also provides a method for dispatching a data packet in an integrated network security device. The data packet has a control key appended with it. The control key controls the dispatching of the data packet across a plurality of applications running on the integrated network security device. The control key stores the remaining operations and applications that are programmed for the data packet containing such control key. It is to be noted that this control key doesn't store the status of the operations and applications already performed.

Figure 1:
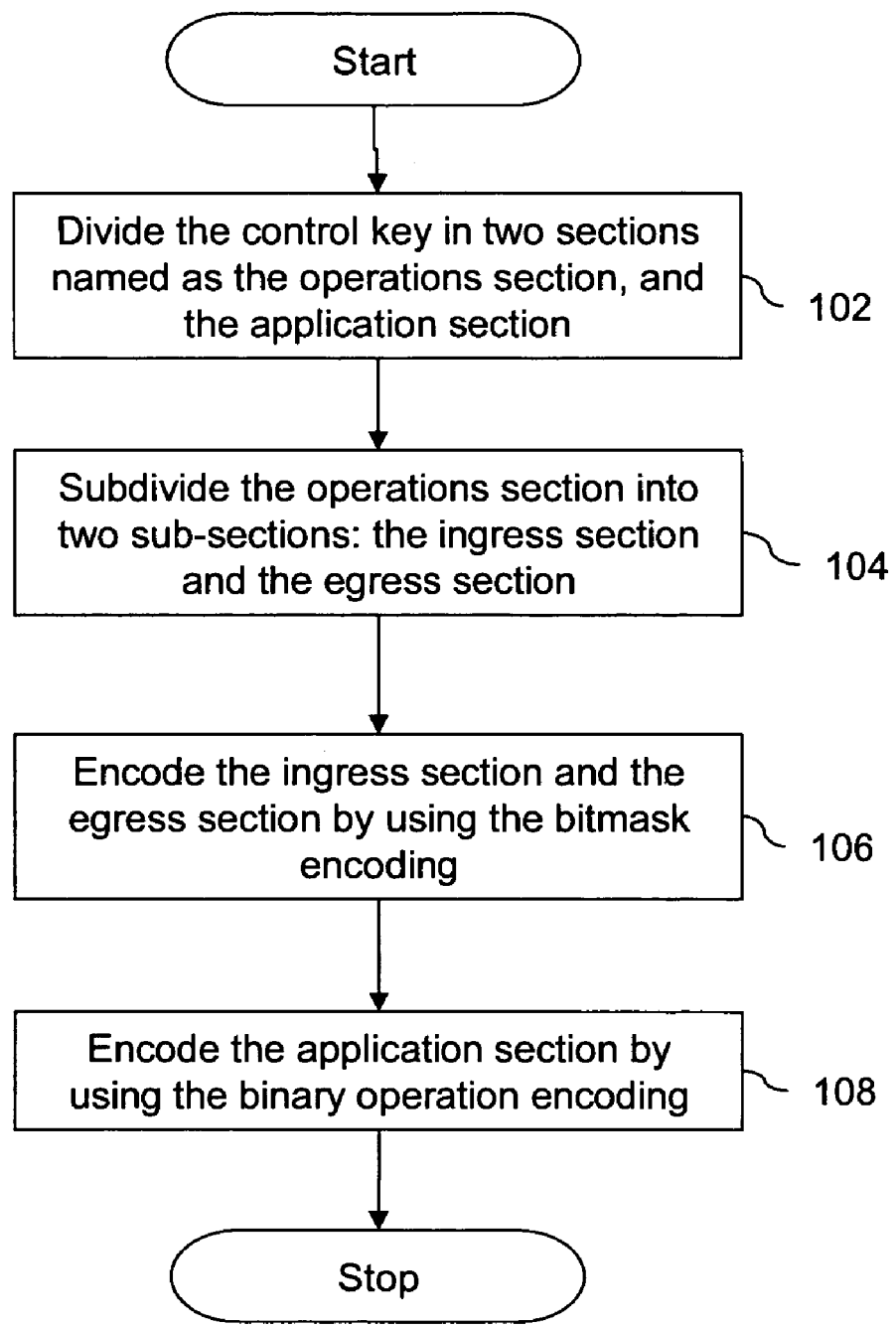
FIG. 1 is a flowchart depicting a method for generating a control key, in accordance with an embodiment of the invention.

FIG. 1 is a flowchart depicting a method for generating a control key, in accordance with an embodiment of the invention. At step 102, a control key is divided into two sections: an operations section and an application section. In accordance with an embodiment of the invention, the two sections are specified at the programming time, and remain unchanged during the running of the apparatus. At step 104, the operations section is further sub-divided into two sections: an ingress section, and an egress section. The control key is allotted an adequate number of bits to store the sequence of applications. In accordance with an embodiment of the invention, 32 bits are allocated to the control key to define the operations to be performed as well as the sequence of applications. The ingress section provides the basic security operations that are applied to data packets entering the device, and the egress section provides the basic security operations that are applied to data packets leaving the device. The application section defines the sequence of advanced security applications applied to the data packet during the transmission of the data packet.

At step 106, the operations section (ingress and egress) is encoded. In accordance with an embodiment of the invention, the operations section (ingress and egress) is encoded using bits. One such technique is a bitmask encoding technique. In accordance with the bitmask encoding technique, each bit identifies an invariable order of operations, based on its position in the control key. In this encoding technique, each bit implicitly carries an operation ID, based on its relative position in the control key. For example, first bit in the ingress section corresponds to the operation ID '1' at the device's input. Examples of the operations being encoded in the ingress section include L2 [Ethernet], L3 [TCP/UDP] and L4 [IP] protocol conformance checks, L2, L3 and L4 being OSI standard protocol layers. The data packet undergoes the operation 1 based on the binary value stored by the first bit. Similarly, other operations also have masking in the bits that follows in the ingress and egress sections. Examples of the operations being encoded in the egress operations section include L4-L2 header fields being transformed by the applications/operations, for example, Network Address Translation (NAT)/Port Address Translation (PAT) calculations, L2, L3 and L4 being Open System Interconnect (OSI) standard protocol layers.

At step 108, the application section is encoded by using a binary application encoding technique. In accordance with the binary application encoding technique, each application is encoded in a binary format. The relative position of the application in the application section defines the sequence of the applications to be applied to the data packets while they are being transmitted.

Figure 2:
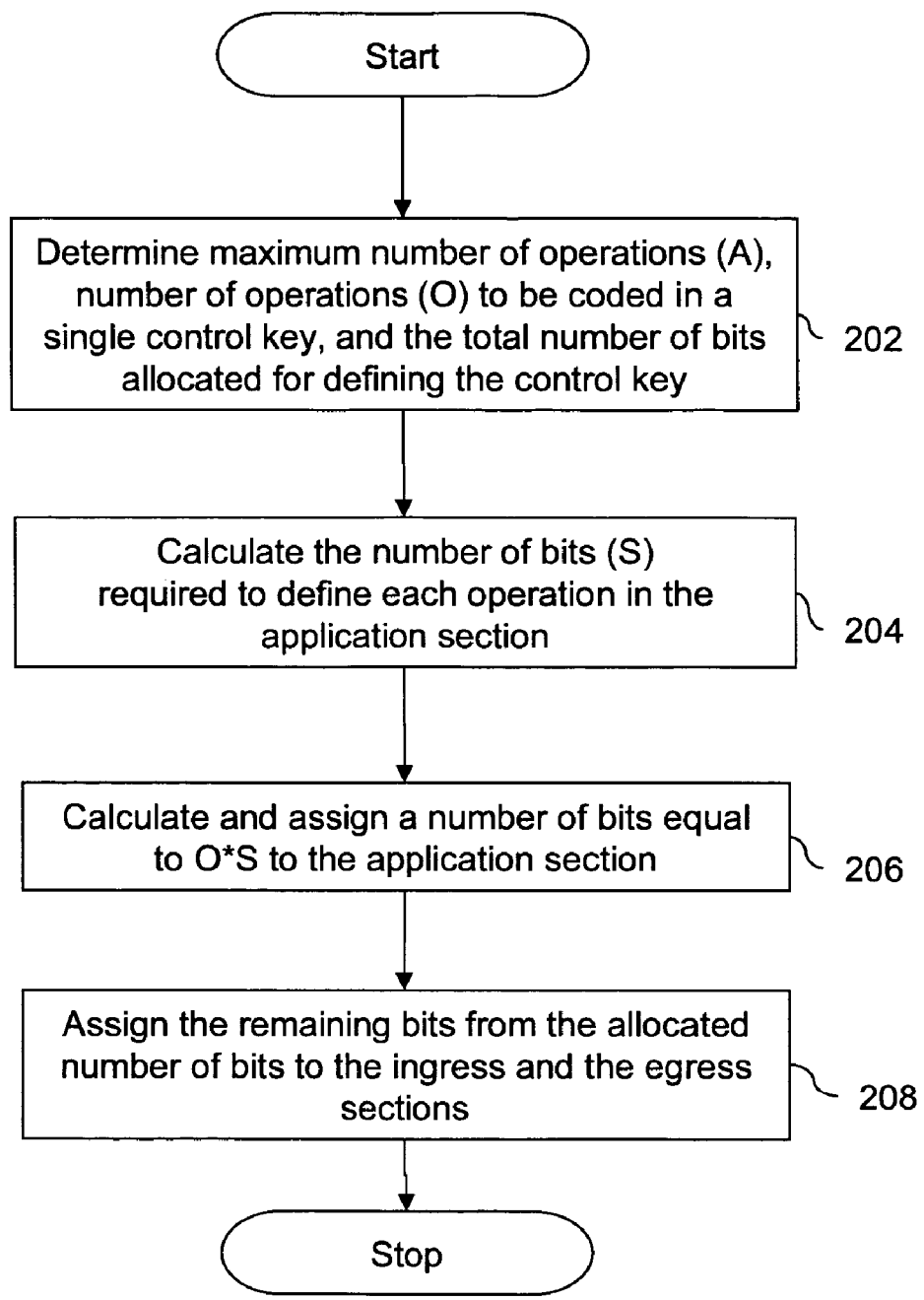
FIG. 2 is a flowchart depicting a method for dividing the control key in two sections, in accordance with an embodiment of the invention.

FIG. 2 is a flowchart depicting a method for dividing the control key in two sections, in accordance with an embodiment of the invention. At step 202, the total number of applications (A) allowed on the integrated network security device, the number of applications (O) to be coded in the application section of a single control key, and the total number of bits allotted (K) to the control key to define the sequence of applications, are determined. In various embodiments of the invention, the determined values are specified by the device developer or programmer while dimensioning the processing and memory requirements of the network security device. In other embodiments of the invention, the minimum number of bits (K) is determined after identifying the total maximum number of different operations (ingress/egress) (N), and adding the maximum number of operations (N) to the number of bits required to encode the application section (S * O). In accordance with an embodiment, the number after addition is rounded off to align to a byte boundary. In an embodiment, the rounding off number is a multiple of 8.

At step 204, the number of bits (S) required to define each application in the application section is calculated. In accordance with an embodiment of the invention, S is equal to the least integer satisfying the equation: $2^{\wedge}(S)>A$, for example, if A=15, S is equal to 4 as $(2^{\wedge}4)>15$. In various embodiments of the invention, the application ID 0 ('zero') signifies 'no application', and it is used when clearing the field of the application the packet, where the packet is dispatched.

At step 206, the application section is assigned a calculated number of bits. The calculation for the number of bits to be assigned to the application section is based on the values of O and S. In accordance with an embodiment of the invention, the calculated number of the bits assigned to the application section is equal to the product O * S. At step 208, the remaining bits, from the total number of bits allocated for the control key, are assigned to the operations section (ingress and egress).

Figure 3:
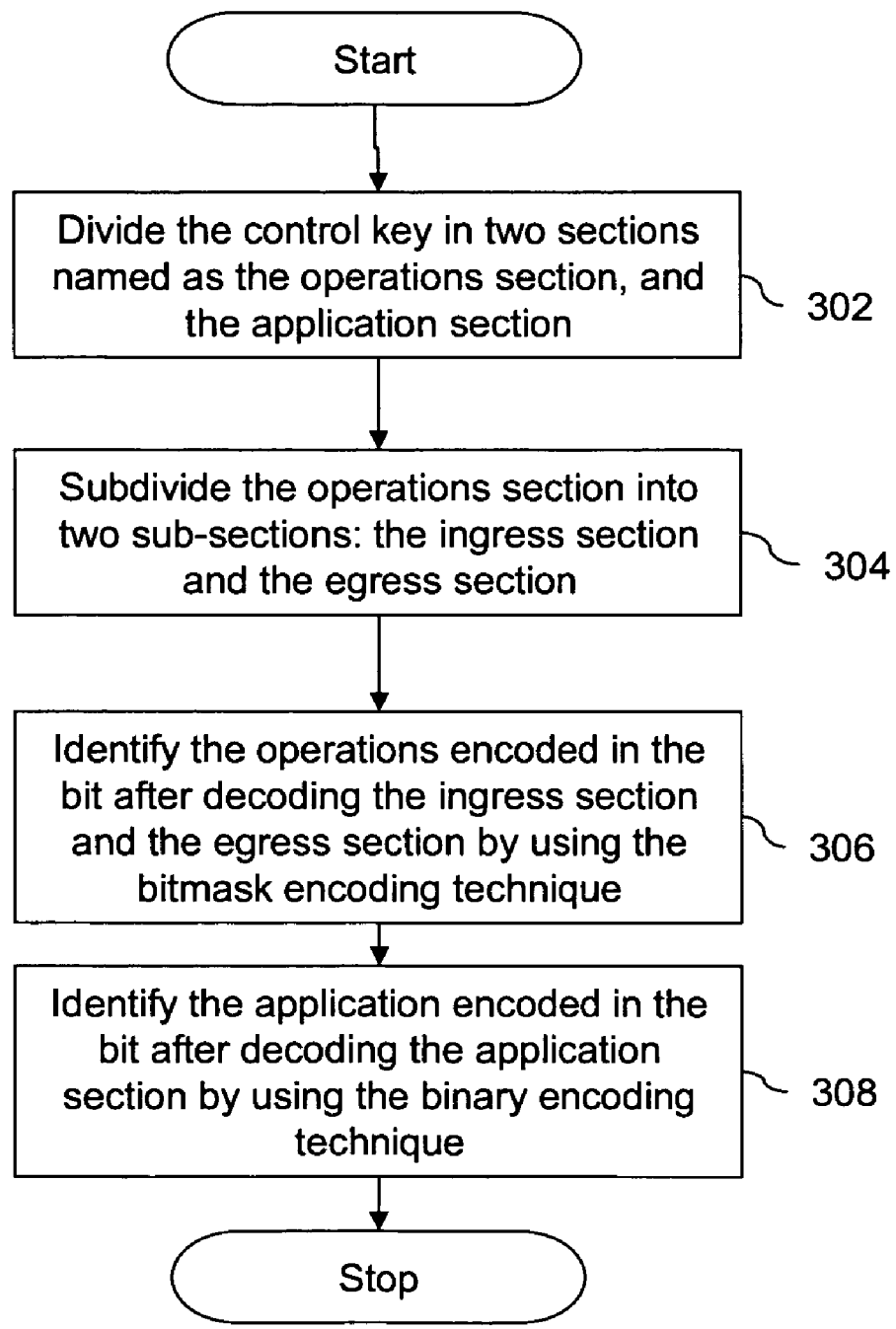
FIG. 3 is a flowchart depicting a method for dispatching a data packet, in accordance with an embodiment of the invention.

FIG. 3 is a flowchart depicting a method for dispatching a data packet appended with the control key, in accordance with an embodiment of the invention. In various embodiments of the invention, dispatching includes understanding the format of the control key.

At step 302, the control key is divided into two sections: operations section and application section. At step 304, the operations section is further subdivided into two sections: ingress operations section and egress operations section, in accordance with an embodiment of the invention. At step 306, the operations that are encoded in the operations section are identified, after decoding the bits encoded in the operations section. Each of the non-zero bits dictates the operations, which the data packet is dispatched with. Further, the non-zero bits are cleared in order to essentially store the operations that are required to be performed. At step 308, the applications encoded in the applications section are identified, after decoding the arrangement of bits in the applications section. In accordance with an embodiment of the invention, the sequence of the encoded applications is identified after decoding the bits in the applications section.

Figure 4:
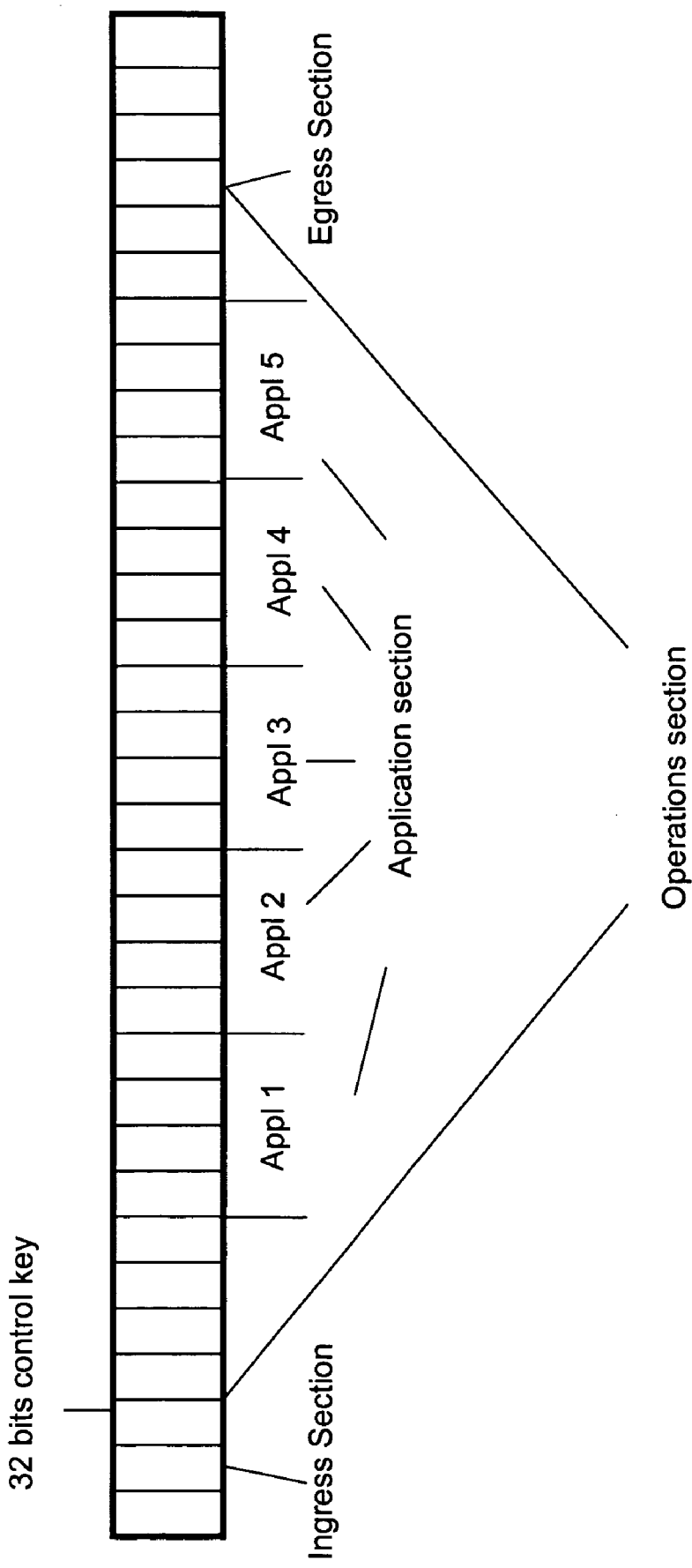
FIG. 4 depicts an exemplary control key, in accordance with an embodiment of the invention.

FIG. 4 depicts an exemplary control key 400, in accordance with an embodiment of the invention. As shown in the figure, control key 400 is shown in the form of a row with 32 columns, wherein each column corresponds to a bit. In the example, the total number of bits (K) allocated to the control key is 32, and the number of applications to be encoded in the application section of the control key (O) is equal to five. The total number of applications (A) is 15. In accordance with the exemplary embodiment, the number of bits required for encoding an application in the application section (S) is equal to four (as $(2^{\wedge}4)>15$). Therefore, the total number of bits assigned to the application section is equal to 4 * 5 (as, O*S), which is equal to 20. As shown in the figure, five applications, application 1 to application 5, each with four bits, are encoded in the application section. Each of the applications in the application section is encoded by using the binary application encoding.

The remaining 12 bits of the allocated number of 32 bits, to control key 400, are assigned to the operations section (ingress and egress). The encoding of the applications in the ingress and egress sections is based on the bitmask encoding technique. In accordance with the bitmask encoding technique, each bit implicitly carries the application ID, based on its relative position in the control key. In an embodiment of the invention, the ingress and egress operations sections are both assigned an equal number of bits, e.g., six in the above example.

Although control key has been explained assuming the total number of bits to be 32, this is only for the purpose of illustration. The total number of bits can be greater or lesser number multiple of 8, without diverting from the scope and spirit of the invention.

Figure 5:
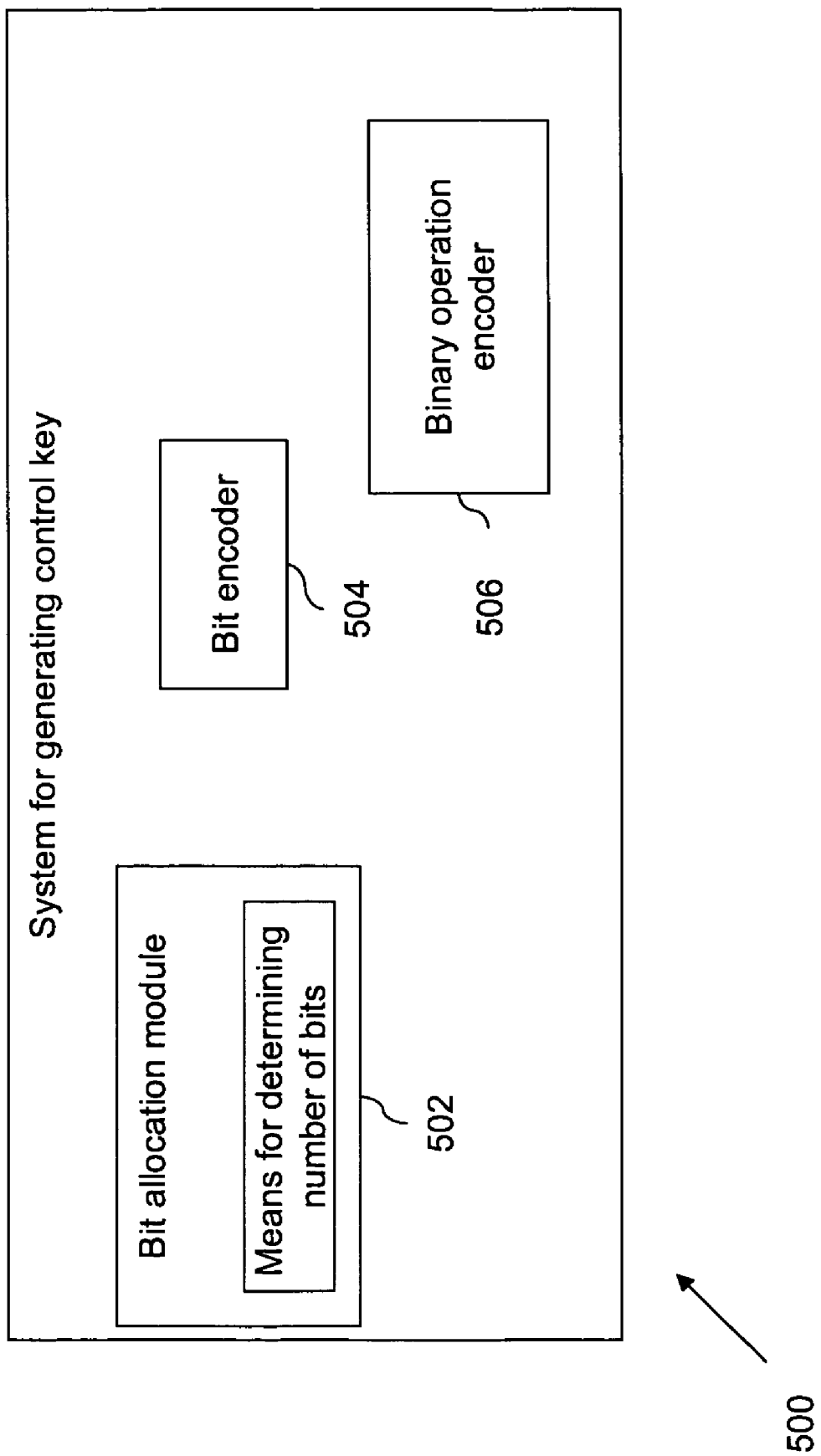
FIG. 5 depicts a system for generating a control key, in accordance with an embodiment of the invention.

FIG. 5 depicts a system 500 for generating a control key, in accordance with an embodiment of the invention. System 500 for generating a control key includes a bit allocation module 502, a bitmask encoder 504, and a binary application encoder 506. Bit allocation module 502 divides the allocated bits into two parts for the two sections of the control key: the operations section and the application section. The number of bits for the operations section is further divided into two parts for the ingress section, and the egress section. Bitmask encoder 504 encodes the operations section (ingress and egress) of the control key by using the bitmask encoding technique. The bitmask encoding technique used has been described earlier in conjunction with FIG. 2.

Binary application encoder 506 encodes the application section of the control key by using binary application encoding. An exemplary binary application encoding technique has been described earlier in conjunction with FIG. 2. In accordance with an embodiment of the invention, bit allocation module 502 includes means for determining number of bits allocated 508 for each of the control key sections and the total number of bits allocated to the control key generation (K). In an embodiment of the invention, bitmask encoder 504, binary application encoder 506, and means for determining number of bits 508 can be implemented as software, hardware, firmware, or their combination thereof.

Figure 6:
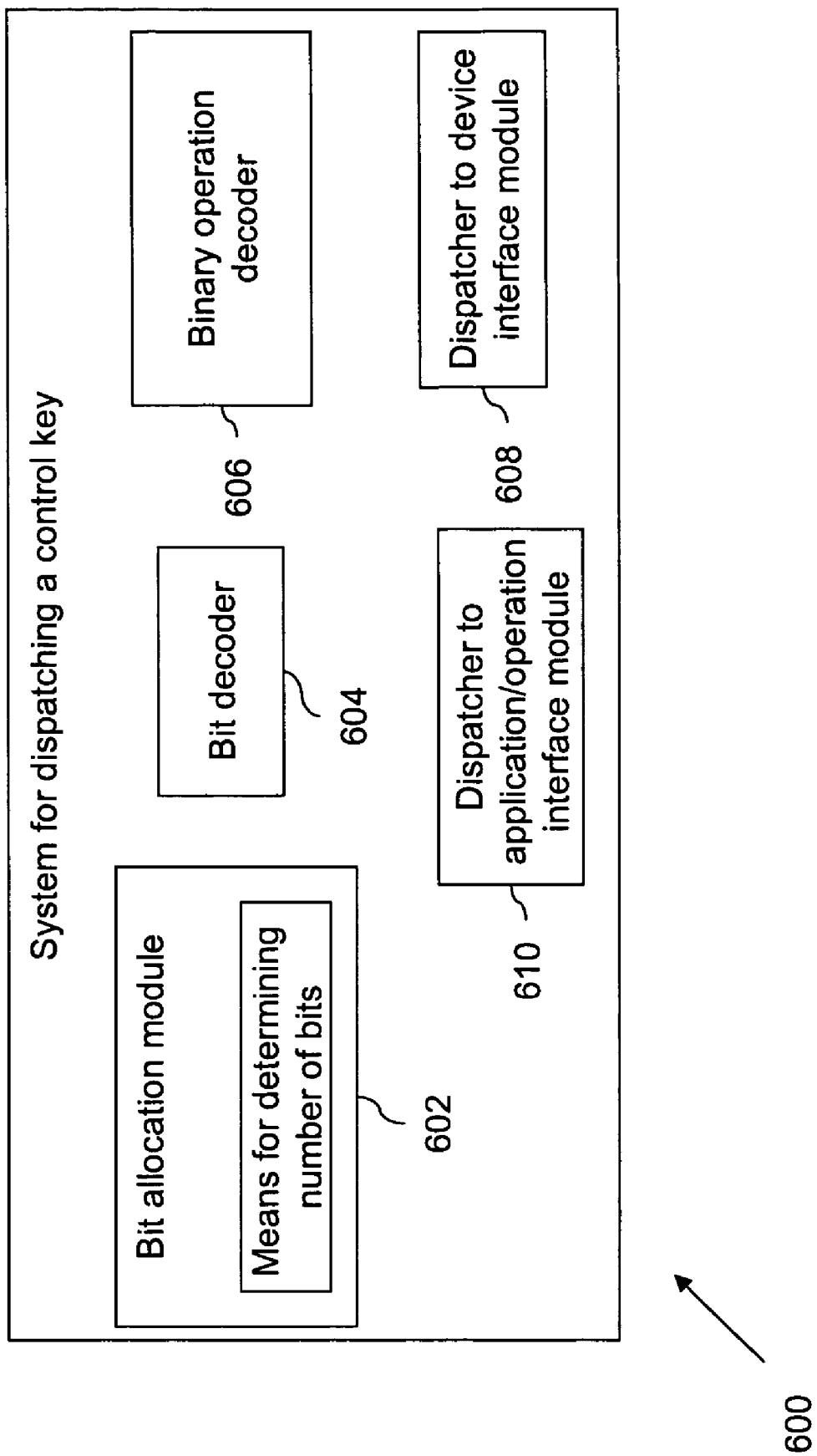
FIG. 6 depicts a system for dispatching a data packet, in accordance with an embodiment of the invention.

FIG. 6 depicts a system 600 for dispatching a data packet appended with a control key, in accordance with an embodiment of the invention. In accordance with an embodiment of the invention, system 600 (also referred to as dispatcher 600) includes bit allocation module 502, a bitmask decoder 602, and a binary decoder 604. Bit allocation module 502 identifies the two sections of the control key: operations section and application section. Bitmask decoder 602 decodes the bits that belong to the operations section. While decoding, it is verified as to which operations are to be performed on the data packet. Binary decoder 604 decodes the sequence of applications to be performed to the data packet. While decoding the sequence of applications, number of applications encoded in the control key is determined. [1]

[2] The data packet traverses through dispatcher 600 before (and after) each software module processes and transforms the packet. Dispatcher uses interface 610 to send/receive data packets from the operations/applications modules. The control key is prepended to the data packet, so that it is available at all times. In various embodiments of the invention, dispatcher 600 deletes the operation/application ID from the control key when the data packet is transmitted to a given operation/application. Deleting these bits/IDs results in a control key that keeps only the application/operation IDs that are to be performed. With this, dispatcher 600 may not keep track of the operations that have already been performed.

Once all the control key bits are cleared (all bits in operations section set to zero, plus all applications fields set to zero), the control key is detached from the data packet and trashed. The packet is then forwarded to the device interface 608, sending the packet to the outside network.

In accordance with an embodiment, system 600 additionally includes a set of input/output software interfaces 608 that interface with the [1] device data packet receiving and transmitting hardware devices. An exemplary interface can be any Ethernet driver manufactured by Cisco Systems, Inc. Further, system 600 includes a set of software input/output interfaces 610 that interface with each of the operation and application software modules. An exemplary software interface can be a standard Linux device driver (based on the standard interface open( ), close( ), read( ) and write( ) kernel calls), open source code manufactured under General Public License (GNU). In accordance with an embodiment, system 600 further includes a read/write mechanism that allows clearing the control key fields stored in a machine-readable medium corresponding to the operation/application the packet being dispatched.

In various embodiments, a given sequence of operations is preprogrammed in software (static), although the control key controls its execution. In an embodiment of the invention, the sequence of applications is based on the sequence programmed in the control key (dynamic). The final execution sequence of operations/applications applied to a data packet depends on: i) the ingress operations whose bits are set to 1 ('one') in the operations section, following the sequence of operations statically preprogrammed on the security device software; ii) the sequence of applications dynamically programmed in the control key; and iii) the egress operations whose bits are set to 1 in the operations section, following the sequence of operations statically preprogrammed on the security device software.

In accordance with an embodiment, the invention provides an apparatus for generating a control key. The control key is appended to a data packet while the data packet is transmitted across a plurality of application, running on an integrated network security device. In accordance with an embodiment, the apparatus comprises a processing system coupled to a display and a user input device, and a machine-readable medium including a plurality of instructions. The plurality of instructions includes, one or more instructions for dividing the control key in two sections, one or more instructions for encoding the ingress and egress section using bits, and one or more instructions for encoding the application section using a binary application encoding technique.

In accordance with another embodiment, the invention provides a machine-readable medium, which includes instructions that are executable by the processor. The instructions include one or more instructions for dividing the control key, one or more instructions for encoding the ingress and egress operations sections, and one or more instructions for encoding the application section.

Embodiments of the invention have the advantage that they provide a method for generating the control key. The generated control key is flexible with respect to the encoding being performed at the application section of the control key. This flexibility has been achieved without increasing the bit size of the control key. The introduction of flexibility reduces the total processing resources allocated for storing the control keys, and therefore reduces the total storage resources dedicated for storing millions of control keys.

Another advantage of the invention is the provision of a method for dispatching the data packet across the applications running on the integrated network security device. The method involves decoding the control key for identifying the operations/applications being encoded in the control key.

Another advantage of the invention is the usage of control keys in integrated security devices, for high-level processing or other high-level application software.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, application, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, applications, or computations may be presented in a specific order, this order may be changed in different embodiments. In some embodiments, multiple steps shown sequentially in this specification can be performed at the same time. The sequence of applications described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or applications are not specifically shown or described in detail to avoid obscuring aspects of embodiments of the invention.

Also in the description herein for embodiments of the invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A control key for controlling the dispatching of a data packet across a plurality of software modules running on an integrated network security device, the control key being appended to the data packet, the control key comprising:
    an operations section including encoded information for operations, the operations being basic security software modules applied in an invariable order, the encoding being performed using bits that indicate the invariable order of applying the basic security software modules, the invariable order being invariable for control keys appended to data packets associated with different connections; and
    an application section including encoded information in binary for the sequence of advanced security software modules to be applied in a programmable and variable order to a given packet, the software modules being the applications to be encoded, wherein the sequence of advanced security software modules are in the variable order for control keys appended to data packets associated with different connections.

2. A method for generating a control key appended to a data packet being processed by an integrated network security device, the control key controlling the dispatching of one or more data packets across a plurality of applications running on the integrated network security device, the method comprising:
    dividing the control key in two sections, the two sections being an operations section, and an application section;
    subdividing the operations section in two subsections, the two sub-sections being an ingress section, and an egress section, wherein the ingress section is applied to a data packet entering the device, and the egress section is applied to the data packet leaving the device;
    encoding the operations section by using bits, wherein each bit identifying a invariable-order operation using its position in the control key, wherein the bits indicate the invariable order of applying operations, the invariable order being invariable for control keys appended to data packets associated with different connections; and
    encoding the application section by using binary application encoding, wherein the binary application coding encodes applications in a variable order for control keys appended to data packets associated with different connections.

3. The method of claim 2, wherein the number of bits allocated for each section is based on the number of operations and applications being encoded by each of the sections.

4. The method of claim 2, wherein the dividing the control key in two sections comprising:
    determining the total number of all applications allowed on the integrated network security device (A);
    determining the maximum number of applications being processed in the order programmed in the control key (O);
    calculating the number of bits (S) required to code each application;
    assigning a calculated number of bits to the application section of the control key, the calculation being based on the S and O; and
    assigning the remaining bits from the total allocated number of bits for the control key to the operations section.

5. The method of claim 4, wherein the calculating S is performed by identifying the minimum integer (S) satisfying the equation $2^{\wedge}(S)>A$, (S) being an integral number.

6. The method of claim 4, wherein the calculated number of bits assigned to the application section is equal to S * O.

7. The method of claim 4, wherein the determining the total minimum number of bits (K) assigned for the control key, comprises:
    identifying the total maximum number of operations (N) that may be performed in the operation section to a single packet;
    adding the maximum number of operations (N) to the number of bits required to encode the application section (S * O); and
    rounding off the number of bits identified after addition to for aligning to a byte boundary.

8. The method of claim 7, wherein the rounded off number is a multiple of 8 greater than the minimum number of bits required for encoding.

9. The method of claim 2, wherein the ingress operations section defines the sequence of applications to be performed to the data packet when entering the network security device.

10. The method of claim 2, wherein the egress operations section defines the sequence of applications to be performed to the data packet when leaving the network security device.

11. A system for generating a control key, the control key being appended to a data packet being transmitted through an integrated network security device, the control key controlling the dispatching of the data packet across a plurality of applications running on the integrated network security device, the system comprising:
    one or more processors; and
    logic encoded in one or more tangible media for execution by the one or more processors and when executed operable to:
    divide the number of bits allocated for a control key into an operations section, and an application section of the control key;
    encode the operations to be encoded at the operation section, wherein each encoded bit identifies an operation requirement based on the bit status at its position in the control key, wherein bit positions indicate the invariable order of applying operations, the invariable order being invariable for control keys appended to data packets associated with different connections; and
    encode the identifiers on the application section of the control key, the binary encoder programming the sequence of the applications being encoded in the application section, wherein the sequence of applications are in the variable order for control keys appended to data packets associated with different connections.

12. The system of claim 11 wherein the bit allocation module comprising means for determining number of bits allocated for the control key and for each of the sections of the control key, the sections of the control key being the operations section and the application section.

13. A method for dispatching a data packet in an integrated network security device, the data packet having a control key attached, the control key controlling the dispatching of the data packet across a plurality of applications running on the integrated network security device, the method comprising:

dividing the control key in two sections, the two sections being an operations section, and an application section;

subdividing the operations section in two subsections, the two sub-sections being an ingress section, and an egress section, the ingress section being applied to a data packet entering the device, and the egress section being applied to a data packet leaving the device;

identifying the operations being encoded in the ingress and the egress operations section, the step comprising decoding bits being encoded in the ingress operations section, wherein the bits identify an invariable order of operations, the decoding being based on the position of the operations in the control key, comprising;

ignoring the operations marked as '0' (zero) in the control key dispatching the data packet to the next decoded operation marked as '1' (one) in the control key, while setting to zero its corresponding bit within the control key;

receiving the data packet from the operation software module once the computation is done; and continue processing the ingress operations section on the control key until all bits have been cleared;

identifying the applications being encoded in the application section, the step comprising decoding bits being encoded in the application section, the bits identifying the applications, and the sequencing of the identified applications, the sequencing of the applications being based on the position of applications in the application section, comprising ignoring the applications marked as '0' in the control key;

dispatching the data packet to the next decoded application, while setting to zero its corresponding field within the control key;

receiving the data packet from the application software module once the computation is done; and continue processing the application section on the control key until all bits have been cleared;

identifying the next operation being encoded in the egress section, the step comprising decoding bits being encoded in the egress operations section, wherein the bits identify an invariable order of operations, the decoding being based on the position of the operations in the control key, comprising ignoring the operations marked as '0' (zero) in the control key;

dispatching the data packet to the next decoded operation marked as '1' (one) in the control key, while setting to zero its corresponding bit within the control key;

receiving the data packet from the operation software module once the computation is done; and continue processing the egress operations section on the control key until all bits have been cleared.

14. A system for dispatching a data packet through an integrated network security device, the data packet having a control key attached, the control key controlling the dispatching of the data packet across a plurality of applications running on the integrated network security device, the system comprising:

a packet sending/receiving interface with hardware devices connected to the outside of the device;

a packet sending/receiving interface with one or more of the operation and application software/hardware modules;

one or more processors; and logic encoded in one or more tangible media for execution by the one or more processors and when executed operable to:

divide the number of bits allocated for a control key into an operations section, and an application section of the control key;

encode the operations to be encoded at the operation section, wherein each encoded bit identifies an operation requirement based on the bit status at its position in the control key, wherein bit positions indicate the invariable order of applying operations, the invariable order being invariable for control keys appended to data packets associated with different connections;

encode the identifiers on the application section of the control key, the binary encoder programming the sequence of the applications being encoded in the application section, wherein the sequence of applications are in the variable order for control keys appended to data packets associated with different connections; and allow clearing each of the entries in the operations sections and the application sections of the control key that data the packet is being dispatched with.

15. An apparatus for generating a control key appended to a data packet being transmitted through a integrated network security device, the control key controlling the dispatching of a data packet to across a plurality of software modules running on the integrated network security device, the apparatus comprising:

a processing system including a processor coupled to a display and user input device; and a machine-readable medium including instructions executable by the processor comprising one or more instructions for dividing the control key in three sections, the three sections being an ingress section, an egress section, and an application section;

one or more instructions for encoding the operations to be performed on both the ingress section and the egress section using bits wherein, each bit identifying an operation using its position in the control key, wherein the bits indicate the invariable order of applying operations, the invariable order being invariable for control keys appended to data packets associated with different connections; and one or more instructions for encoding the application section using binary application coding, wherein the binary application coding encodes applications in a variable order for control keys appended to data packets associated with different connections.

16. A machine-readable medium including instructions executable by the processor for generating a control key appended to a data packet being transmitted through a integrated network security device, the control key controlling the dispatching of a data packet to across a plurality of software modules running on the integrated network security device, the machine-readable medium comprising:

one or more instructions for dividing the control key in three sections, the three sections being an ingress section, an egress section, and an application section;

one or more instructions for encoding the operations to be performed on both the ingress section and the egress section using bits wherein, each bit identifying an operation using its position in the control key, wherein the bits indicate the invariable order of applying operations, the invariable order being invariable for control keys appended to data packets associated with different connections; and one or more instructions for encoding the application section using binary application coding, wherein the binary application coding encodes applications in a variable order for control keys appended to data packets associated with different connections.

17. A system for generating a control key, the control key being appended to a data packet being processed by an integrated network security device, the control key controlling the dispatching of the data packet across a plurality of applications running on the integrated network security device, the system comprising:

a network device comprising:

means for dividing the control key in two sections, the two sections being an operations section, and an application section;

means for subdividing the operations section in two sub-sections, the two sub-sections being an ingress section, and an egress section, the ingress section being applied to data packets entering the device, and egress section being applied to data packets leaving the device;

means for encoding the operations section by using bits, wherein each bit identifies a invariable-order operation using its position in the control key, wherein the bits indicate the invariable-order of applying operations, the invariable-order being invariable for control keys appended to data packets associated with different connections; and means for encoding the application section by using binary application encoding, wherein the binary application coding encodes applications in a variable order for control keys appended to data packets associated with different connections.

18. The system of claim 11 wherein the number of bits allocated for each section by the bit allocation module is based on the number of operations and applications being encoded by each of the sections.

19. The system of claim 11 wherein said bit allocation module determines the total number of all applications allowed on the integrated network security device.

20. The system of claim 19 wherein said bit allocation module assigns a calculated number of bits to the application section of the control key and assigns the remaining bits from the total allocated number of bits for the control key to the operations section.

* * * * *

UNITED STATES PATENT AND TRADEMARK OFFICE
CERTIFICATE OF CORRECTION

PATENT NO. : 7,600,115 B2  Page 1 of 1
APPLICATION NO. : 11/099811
DATED : October 6, 2009
INVENTOR(S) : Rabadan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1219 days.

Signed and Sealed this

Fifth Day of October, 2010

David J. Kappos
*Director of the United States Patent and Trademark Office*